United States Patent [19]

Pipoz

[11] 3,990,660
[45] Nov. 9, 1976

[54] BOAT AUXILIARY MOTOR SUPPORT

[76] Inventor: Georges R. Pipoz, 108, Avenue Leopold-Robert, 2300 La Chaux-de-Fonds, Switzerland

[22] Filed: Nov. 10, 1975

[21] Appl. No.: 630,728

[52] U.S. Cl. .................................... 248/4; 115/17; 115/41 R; 248/281
[51] Int. Cl.² ........................................ F16M 1/02
[58] Field of Search .............. 115/41 R, 41 HT, 17; 248/4, 15, 16, 280, 281; 267/64 R, 64 A, 64 B, 118, 120, 124

[56] References Cited
UNITED STATES PATENTS

| | | | |
|---|---|---|---|
| 2,643,837 | 6/1953 | Rivers | 248/4 |
| 2,737,920 | 3/1956 | Heath | 115/41 R |
| 3,003,724 | 10/1961 | Kiekhaefer | 248/15 |
| 3,032,304 | 5/1962 | Machlin | 115/17 |
| 3,075,490 | 1/1963 | Lang | 115/41 R |
| 3,245,641 | 4/1966 | Hart | 115/41 R |

*Primary Examiner*—Trygve M. Blix
*Assistant Examiner*—Gregory W. O'Connor
*Attorney, Agent, or Firm*—Ulle C. Linton

[57] ABSTRACT

A boat auxiliary motor support, comprising a base, a bracket and two levers between which is mounted a control system comprising one cylinder, one piston and one hollow piston rod containing a control rod free to slide axially. The interior of the cylinder is divided up by a floating piston into a chamber filled with gas and forming a gas sprint and two chambers filled with oil and separated by the piston. The control rod rests against a valve mounted in the piston, that allows the oil to flow from one chamber to the other through a duct. A control system is mounted at the free end of the control rod to open the valve.

4 Claims, 3 Drawing Figures

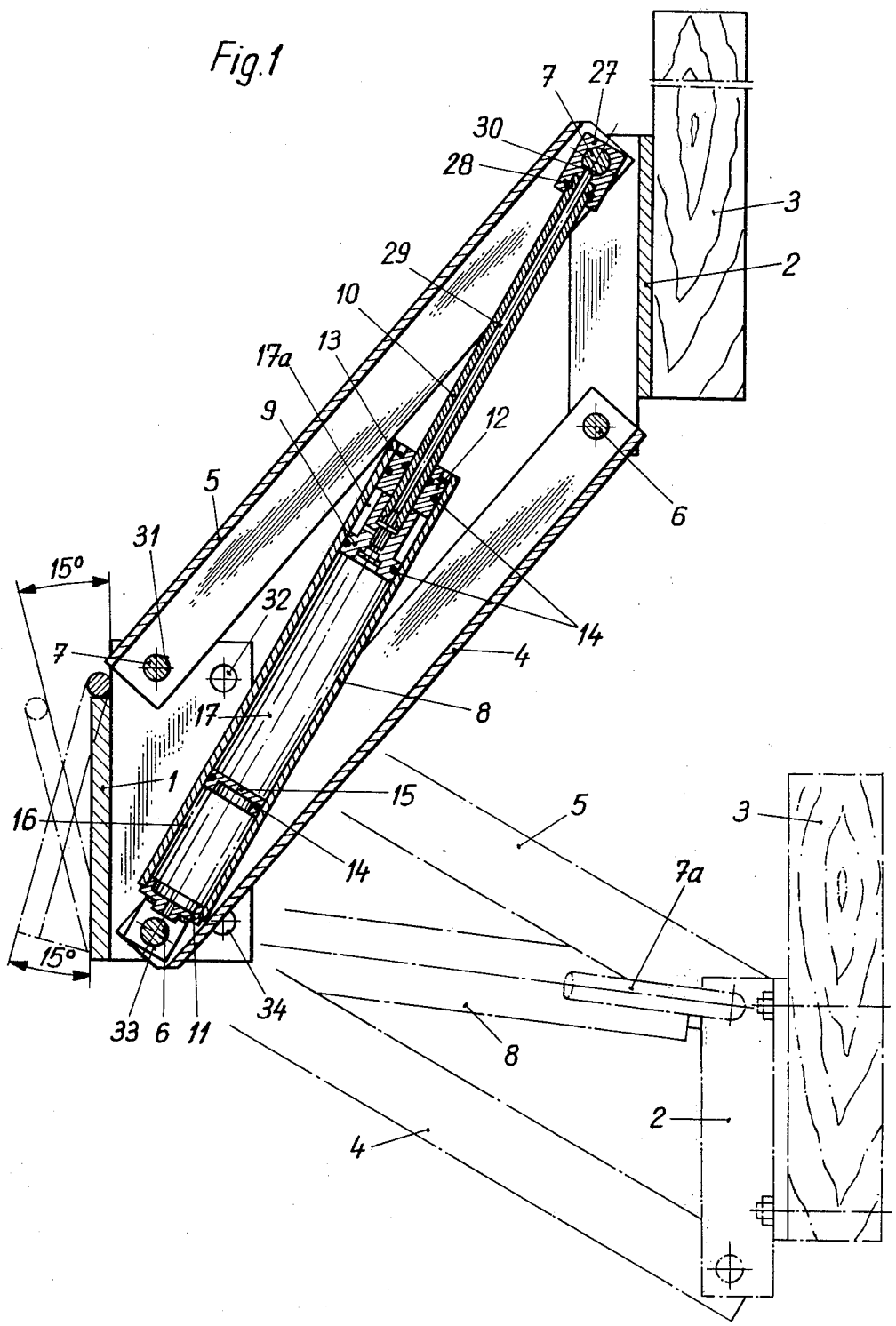

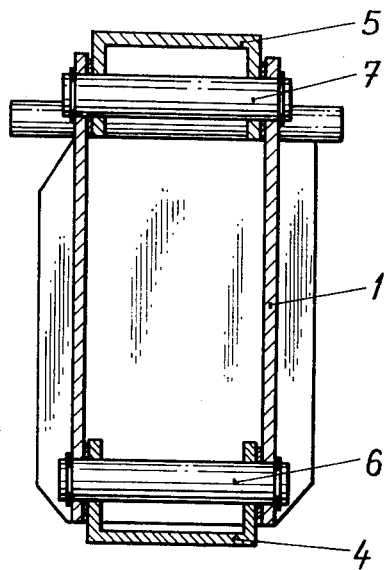
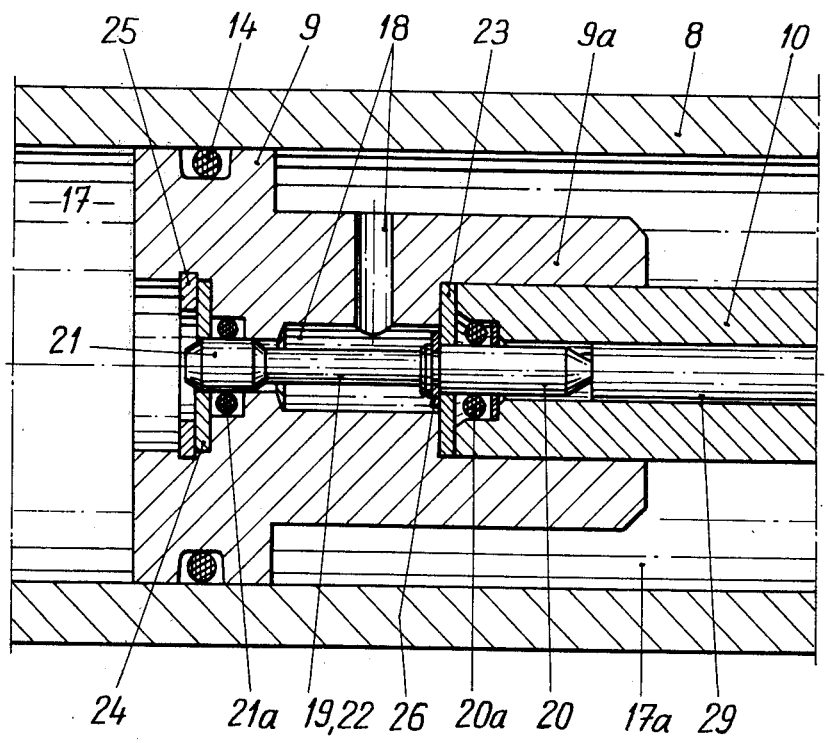

BOAT AUXILIARY MOTOR SUPPORT

The subject of this invention is a boat auxiliary motor support.

Boat auxiliary motors are generally transom mounted and must be capable of being lifted until the propeller clears the water, either prior to grounding, in shallow water, or when the boat is being rowed or sailed, to eliminate the drag caused by the propeller in the water. Furthermore, it is of value to be able to adjust the height of the motor, when the propeller is submerged, so as to adapt the depth of the propeller to suit the height of the stern of the boat and the wave height.

Most boat auxiliary motors can be tilted so that the propeller clears the water. However, the extent of this tilt is often insufficient, especially when the boat is heeled in cases where the motor cannot be mounted on the boat centreline.

Furthermore, this operation is only possible if there is sufficient clearance between the hull and the motor. On a large number of boats, especially stern cabin sailing boats, the transom is too high and, when the motor is tilted, it makes contact with the transom or the stern decking.

A number of different designs have been brought out, to date, most of which taking the form of a slide mounted on the boat transom. One of these methods connects the sliding support to a cable which raises or lowers the motor. Such an arrangement involves the application of extensive effort and, in heavy seas, the operation is a hazardous one.

This invention is aimed at producing a support on which the weight of the motor is counterbalanced for each position and, for practical purposes, compensated by at least one gas spring. The main feature of the support is a parallelogram consisting of a base to be secured to the transom, a bracket on which the auxiliary motor is mounted and two levers hinging on both the base and the bracket between which is fitted a control system consisting of at least one cylinder, one piston and one hollow piston rod containing a control rod capable of axial movement. The inside of the cylinder is divided up by a floating piston into a compartment filled with gas, acting as a gas spring, and two compartments, filled with oil, and separated by the piston. The control rod locates on a valve mounted in the piston and this allows the oil to flow from one compartment to the other through a duct. The control system is connected to the other end of the control rod and this operates the rod to open the valve and allow the parallelogram system to move. When the valve closes it locks the parallelogram in any required position.

The attached drawings show an example of the invention, i.e.

FIG. 1 is a vertical section of the support;
FIG. 2 is a section through one of the parallelogram hinge points;
FIG. 3 is a longitudinal large scale section of the valve piston.

The support shown consists of a parallelogram, the short edges of which are formed by a base 1 designed to be mounted on the transom of the sailing boat and a bracket 2, equipped with a wooden pad 3 to which the auxiliary motor is secured. The long edges of the parallelogram consist of channel sections, 4 and 5, hinging on the base 1 and the bracket 2 (FIGS. 1 and 2). These four parts hinge on studs 6 and 7. The upper stud 7 on which bracket 2 hinges, constitutes a control unit and has a handle, 7a, at its end. Between the lower stud 6, connected to the base 1, and the upper stud 7, connected to the bracket 2, is a cylinder 8, hinging on the studs and containing a piston 9 on a hollow piston rod 10. The hinge pins for cylinder 9 and the hollow piston rod 10 also act as hinge pins for the parallelogram. Cylinder 8 is closed off, at its lower end, by a plug 11 equipped with a valve (not shown) which is used for altering the gas pressure and, at its upper end, by a plug 12 retained by circlip 13 and through which the hollow piston rod 10 slides. The seal between the piston rod and plug 12, and between cylinder 8 and piston 9, consists of O rings 14.

A floating piston 15, fitted with a seal 14, divides the space between plugs 11 and 12 into three compartments 16, 17 and 17a. Chamber 16 contains pressurised gas, for example nitrogen, and constitutes a gas spring. Chambers 17 and 17a are filled with oil and are separated by piston 9. This piston has a smaller diameter section 9a, which points towards plug 12 (see FIG. 3) and a duct 18 which is closed off, along the centreline of cylinder 8, by a valve 19, end 20 of which slides in the hollow piston rod 10 and the opposite end, 21, of which when the valve is in the closed position, blocks off duct 18. End 21 terminates in a tapered section, and the centre part, 22, which falls between ends 20 and 21, is of reduced diameter. The two end sections 20 and 21, of valve 19, are guided in bushes 23 and 24. Bush 23 is placed between the piston body 9 and the hollow piston rod 10. Bush 24 is retained in the piston body by a circlip 25. Sealing consists of O rings 20a and 21a. A circlip 26 acts as a stop for valve 19 on its travel in the direction of the hollow piston rod 10.

At the opposite end, the hollow piston rod 10 is guided in a pivoting end fitting 27 and secured to it by two pins 28. The hollow piston rod 10 contains a control rod 29, that can move, axially. One end of this rod makes contact with section 20 of valve 19 and the other end rests against the control that consists of stud 7 and its handle 7a. This handle has a flat section on it against which, when valve 19 is closed, the valve rod 29 rests. Piston 9 cannot therefore move in the cylinder 8 until the valve 19 is opened, because the oil is subjected to the pressure the gas contained in chamber 16 (approximately 130 bars).

If the auxiliary motor has to be lowered or raised, moving handle 7a causes the circular section of stud 7 to act as a cam and push the control rod 29 down. Valve 19 is opened and allows oil to flow between the two oil chambers 17 and 17a. The cross sectional area difference between chambers 17 and 17a subjects the piston rod 10 to a force that is proportional to its cross sectional area and to the pressure of the gas that tends to force the piston rod outwards and consequently counterbalance the weight of the motor. The effort required therefore to lift or lower the motor is very small. When the required height is obtained, handle 7a is returned to its original position, valve 19 is closed and the parallelogram is therefore locked in this position.

The pressure of the gas contained in chamber 16 should be adjusted to suit the weight of the motor. By selecting a gas pressure slightly higher than that necessary to counterbalance the motor, one can obtain an automatic motor lift when valve 19 is opened by moving handle 7a as already described. However, it would then be necessary to press down on the motor to lower it, although applying this effort is much easier than applying effort in the opposite direction.

Two upper holes 31 and 32 and two lower holes 33 and 34 are drilled in base 1. If the boat transom is vertical, holes 31 and 33 are used as shown in FIG. 1. However, if the transom tilts outwards (generally by 15°), holes 31 and 34 are used and if the transom is tilted inwards, the parallelogram is hinged around holes 32 and 33.

On versions not shown here, the tilt adjustment holes may be drilled in bracket 2 or in both base 1 and bracket 2.

For a given design, the maximum weight of the motor that can be counterbalanced will depend on the strength of the piston rod 10, the cylinder 8 and the maximum gas pressure. To get round these limits, two or more gas lifting systems identical to that shown in FIG. 1 can be mounted between the base 1 and the bracket 2. A single control system can be used to open and close the lifting system valves, simultaneously.

I claim:

1. A boat auxiliary motor support consisting of a parallelogram, comprising a base to be mounted on the transom of the boat, a bracket to support the auxiliary motor and two levers hinging on the base and the bracket and between which is mounted a control system comprising at least one cylinder, one piston and one hollow piston rod containing a control rod free to slide axially, characterized in that the interior of the cylinder is divided up by a floating piston into one chamber filled with gas and forming a gas spring and two chambers filled with oil and separated by the piston, in that the control rod rests against a valve mounted in the piston, that allows the oil to flow from one chamber to the other through a duct and in that a control system is mounted at the free end of the control rod to open the valve, so that the parallelogram can be moved and, when the valve is closed, the parallelogram is locked in the required position.

2. A support as claimed in claim 1, characterized in that the control unit is equipped with a handle which locks the parallelogram in any required position and which has a flat section acting as a cam against rod.

3. A support as claimed in claim 1, characterized in that the base and/or the bracket have holes in them that permit the mounting to be fitted to boats the transoms of which are at different angles of tilt.

4. A support as claimed in claim 1, characterized in that the cylinder is closed off by a plug in which there is a valve permitting the gas pressure to be altered.

* * * * *